Figure 1:
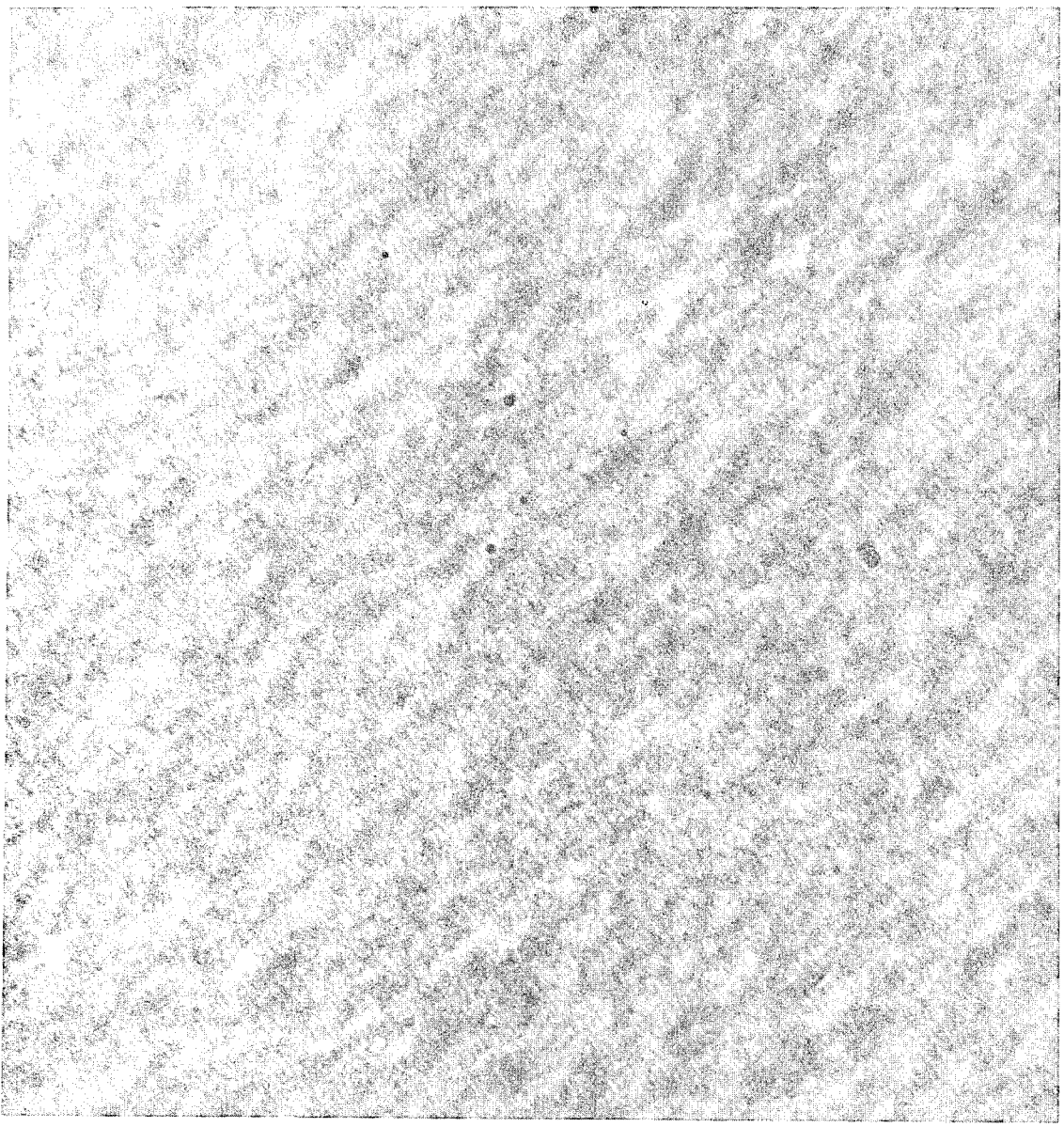

United States Patent [19]

Fellmann et al.

[11] 4,281,084

[45] Jul. 28, 1981

[54] COCONTINUOUS INTERPENETRATING MORPHOLOGICAL NETWORK COMPOSITION OF POLYMER OF METHYL METHACRYLATE AND POLYMER OF ETHYLENE-VINYL ACETATE

[75] Inventors: Robert P. Fellmann, Wrightstown; Daniel R. Kory, Levittown; William H. Staas, Churchville, all of Pa.

[73] Assignee: Rohm and Haas Company, Philadelphia, Pa.

[21] Appl. No.: 737,628

[22] Filed: Nov. 1, 1976

[51] Int. Cl.$^3$ .................... C08L 23/26; C08L 31/04
[52] U.S. Cl. .................... 525/309; 525/263; 525/302
[58] Field of Search .................. 260/878 R, 897 B; 525/309

[56] References Cited

U.S. PATENT DOCUMENTS

| | | | |
|---|---|---|---|
| 3,646,164 | 2/1972 | Deichert et al. | 260/878 R |
| 3,749,756 | 7/1973 | Kosaka et al. | 260/878 R |
| 3,773,699 | 11/1973 | Bergmeister et al. | 260/878 R |

OTHER PUBLICATIONS

McManimie, Robert J. "Catalytic Polymerization of Acrylates and Methacrylates for Castings," (French Pat. No. 1,545,604) Chem. Abstracts 71 (1969), 225530.

*Primary Examiner*—Harold D. Anderson
*Attorney, Agent, or Firm*—Michael B. Fein

[57] ABSTRACT

Compositions comprising cocontinuous interpenetrating network of a polymer of at least 50 weight percent methyl methacrylate and a polymer of ethylene and vinyl acetate, and process for preparing such compositions comprising polymerizing the major portion below 55° C.

7 Claims, 5 Drawing Figures

COCONTINUOUS INTERPENETRATING MORPHOLOGICAL NETWORK COMPOSITION OF POLYMER OF METHYL METHACRYLATE AND POLYMER OF ETHYLENE-VINYL ACETATE

BACKGROUND OF THE INVENTION

1. Field of the Invention

This invention relates to high impact resistant polymeric materials and processes for making them.

2. Description of the Prior Art

Polymer blends of polymethyl methacrylate and ethylene-vinyl acetate for impact resistance have been suggested by others; for example Deichert et al, U.S. Pat. No. 3,646,164, Kiuchi et al, U.S. Pat. No. 3,742,090, Schmitt et al, U.S. Pat. No. 3,700,754, and Ennor et al Canadian Patent 697,734. However, none of the materials produced under the prior art have become commercially successful due to certain deficiencies in properties of the resultant materials, including relatively low modulus, poor clarity, and low service temperature. Electron microscopy of the prior art materials indicate a polymer morphology resembling either typical filled rubber, i.e., small discrete particles of glassy polymer in a largely continuous rubber matrix, or a continuous glassy matrix containing discrete rubber particles.

SUMMARY OF THE INVENTION

It is an object of the present invention to provide a polymer blend of polymethyl methacrylate and ethylene-vinyl acetate of improved properties.

A further object is to provide a process for producing polymer blends of polymethyl methacrylate and ethylene-vinyl acetate polymer which results in a product of improved properties.

These objects, and others as will become apparent from the following disclosure, are achieved by the present invention which comprises a cocontinuous interpenetrating network of (A) a polymer of at least 50 weight percent methyl methacrylate units and (B) a polymer of ethylene and vinyl acetate. In another aspect, the invention comprises a unique process for achieving the above described unique morphology comprising: A. dissolving a polymer of ethylene and vinyl acetate in a monomer system comprising at least 50 weight percent methyl methacrylate; B. adding to the resultant solution a free radical catalyst and reducing the temperature of the solution to below 55° C. while polymerizing the major portion of said monomer system to form a cocontinuous diffuse interpenetrating polymer morphology.

DETAILED DESCRIPTION OF THE INVENTION AND DESCRIPTION OF THE PREFERRED EMBODIMENTS

The compositions of the invention have utility as high impact plastic sheet in applications similar to acrylic sheet and polycarbonate sheet such as for glazing and signs.

The novel process is as above-described and has utility in producing the above-described compositions. Upon dissolving the ethylene-vinyl acetate polymer in a monomer system comprising at least 50 weight percent methyl methacrylate, the solution is preferably maintained at least about 60° C. to prevent gelation of the ethylene-vinyl acetate polymer until the mold is filled. After introducing the solution to the mold, the temperature is reduced to below 55° C., preferably to about 45° C., prior to polymerization.

The polymerization is conducted at these relatively low temperatures in the absence of agitation in a closed cell under positive pressures of up to 2000 psi.

After polymerization is complete to the extent that the morphology is set, preferably until less than 20% residual monomer remains, the material is cured at a higher polymerization temperature, preferably at least 90° C., to reduce residual monomer content to below about 2 weight percent, preferably, and below about 1 weight percent, more preferably.

Suitable catalysts include for example, the organic peroxides such as methyl ethyl ketone peroxide, benzoyl peroxide; the hydroperoxides such as cumene hydroperoxide; the peroxydicarbonates, such as diisopropyl peroxydicarbonate or di (2-ethyl hexyl) peroxydicarbonate; the persulfate type compounds such as potassium persulfate, or catalysts such as azobisisobutyronitrile and the like.

Additionally, such catalysts as lauroyl peroxide, 2,5-dimethyl-2,5-di(t-butylperoxy) hexane, the dialkyl peroxides, e.g., diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiaryamyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc., unsymmetrical or mixed diacyl peroxides, e.g. acetyl benzoyl peroxide, propionyl benzoyl peroxide, etc., terpene oxides, e.g. ascaridole, etc.; and salts of inorganic peracids, e.g. ammonium persulfate, sodium persulfate, sodium percarbonate, potassium percarbonate, sodium perborate, potassium perborate, sodium perphosphate, potassium perphosphate, potassium persulfate, etc. may be used. Other organic peroxide catalysts which may be employed are the following: 1,1,3,3-tetramethyl butyl peroxy-2,2-diethyl butyrate, 2,5-dimethyl-2,5-di(neodecanoyl peroxy) hexane, 3-methyl-3-(pivaloyl peroxy) butene-1, acetyl 2-chloro octanoyl peroxide, acetyl sec-heptyl sulfonyl peroxide, t-butyl peroxyneodecanoate, 2,7-dimethyl-2,7-di(pivaloyl peroxy) octane, acetyl peroxy isobutyl carbonate, tetralin hydroperoxide, tertiary-butyl diperphthalate, tertiary-butyl perbenzoate, 2,4-dichlorobenzoyl peroxide, urea peroxide, caprylyl peroxide, p-chlorobenzoyl peroxide, 2,2-bis(tertiary butylperoxy) butane, hydroxyheptylperoxide, the diperoxide of benzaldehyde and the like. Generally the catalysts may be employed in amounts ranging from about 0.01 percent to 10.0 percent by weight, based on the weight of the monomer employed. The preferred catalyst is t-butyl peroxypivalate.

The ethylene copolymers used herein are generally well known in the art and their properties and methods for their preparation are more fully discussed in U.S. Pat. No. 3,218,373, mentioned above, which patent is hereby incorporated herein by reference. The ethylene copolymer rubber may be cross-linked or non-crosslinked. If a cross-linked ethylene copolymer rubber is used, it may be cross-linked by contacting the ethylene copolymer rubber with a peroxide catalyst and heating, by radiation, or by any other known method. The rubbery copolymers we have found useful comprise (1) from about 50 percent to about 95 percent of ethylene, (2) from about 5 percent to about 50 percent of vinyl acetate; alkyl acrylate or methacrylate, said alkyl group containing from about 1-18 carbon atoms, inclusive; acrylic acid; methacrylic acid; or mixtures of two or more of said monomers; and may also contain (3) up to 20 percent, by weight, based on the total weight of the final ethylene polymer, i.e. that comprising (1), (2) and (3) of any of the copolymerizable monomers set forth hereinbelow in regard to the comonomers useful with methyl methacrylate. The rubbery ethylene copolymer may have a melt index, as determined by ASTM-D1238-57T (grams/-10 min.), of from about 0.1 to about 400, preferably 1.0 to 350. The ethylene copolymer rubber should be present in the final compositions of our invention in amounts ranging from about 1.0 percent to about 75 percent, by weight, preferably from about 10 percent to about 50 percent, by weight, based on the total weight of the final compositions.

The methyl methacrylate resinous polymer phase of the compositions produced by our novel process may be comprised of (A) from about 50 percent to about 100 percent of methyl methacrylate and, correspondingly, (B) from about 0 to about 50 percent of vinyl acetate or an alkyl acrylate. Mixtures of vinyl acetate and an alkyl acrylate may also be used in the copolymer phase in the above concentrations. The methyl methacrylate copolymer, i.e. that containing vinyl acetate and/or alkyl acrylate, may also contain, in addition thereto, (C) up to 20 percent, by weight, based on the total weight of the polymer, that comprising (A), (B) and (C), of a copolymerizable monomer such as the allyl, methallyl, crotyl, 1-chloroallyl, 2-chlorallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, sucinic, glutaric, adipic, pimelic, suberic, azelaic, maleic, fumaric, citraconic, mesaconic, itaconic, benzoic, phenylacetic, phthalic, terephthalic, benzoylphthalic, etc., acids; the saturated monohydric alcohol esters, e.g., the methyl, ethyl, propyl, isopropyl, butyl, sec-butyl, amyl, etc., esters of ethylenically unsaturated aliphatic monobasic and polybasic acids, illustrative examples of which appear above; acrylic acid, methacrylic acid; vinyl cyclic compounds (including monovinyl aromatic hydrocarbons) e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -flourostyrenes, -methylstyrenes, -ethylstyrenes, -cyanostyrene, etc., vinyl naphthalene, divinyl benzene, trivinyl benzene, allyl benzene, diallyl benzene, the various allyl cyanostyrenes, the various alpha-substituted styrenes and alpha-substituted ring substituted styrenes, e.g., alpha-methyl styrene, alpha-methyl para-methyl styrene, etc.; unsaturated ethers, e.g., ethyl vinyl ether, diallyl ether, etc.; unsaturated amides, for instance, acrylamide and N-substituted acrylamides, e.g.; N-methylol acrylamide, N-allyl acrylamide, N-methyl acrylamide, N-phenyl acrylamide, etc.; unsaturated ketones, e.g., methyl vinyl ketone, methyl allyl ketone, etc.; unsaturated polyhydric alcohol (e.g., butenediol, etc.) esters of saturated and unsaturated, aliphatic and aromatic, monobasic and polybasic acids, and the like. Other examples of monomers that can be interpolymerized with the methyl methacrylate, vinyl acetate and/or alkyl acrylate are the vinyl halides, more particularly vinyl chloride, vinyl bromide and vinyl iodide, and the various vinylidene compounds, including vinylidene bromide, vinylidene fluoride and vinylidene iodide. Among other comonomers which may be used in carrying our invention into effect by interpolymerizing them with the methyl methacrylate, vinyl acetate and/or alkyl acrylate are, for example, compounds such as acrylonitrile, and other compounds, e.g., the various substituted acrylonitriles (e.g. methacrylontrile, ethacrylontrile, phenylacrylonitrile, etc.) the various N- substituted acrylamides and alkacrylamides, for instance, N-dialkyl acrylamides and methacrylamides, e.g. N-dimethyl, -diethyl, -dipropyl, -dibutyl, etc., acrylamides and methacrylamides, also other acrylates and methacrylates such as methyl acrylate, n-hexyl acrylate, t-butyl methacrylate, stearyl methacrylate and the like. The resinous, polymeric methyl methacrylate phase of the casting produced according to our process should be present in the final compositions in amounts ranging from about 25 percent to about 90 percent by weight preferably 50 percent to about 90 percent, by weight, based on the total weight of the composition. The ethylene rubber to monomer ratio in the interpolymerization reaction should range from about 0.0101/1 to about 3.0/1.0.

Conventional stabilizers, fillers, pigments, reinforcements, modifiers and other additives can be added if desired.

The following examples are set forth to illustrate the invention but are not to be construed as limiting the invention except as set forth in the claims. All parts and percentages are by weight unless otherwise specified.

EXAMPLE 1 ("Cold Cast")

60 gms. of ethylene/vinyl acetate (EVA) copolymer (75/25) are dissolved in 230 gms. methyl methacrylate (MMA) monomer at 70°-80° C. until the solution is completely clear. The resultant solution is mixed with a catalyst solution of 2 gms. t-butyl peroxypivalate in 10 gms. MMA and introduced into a stainless steel mold consisting of a pair of caul plates separated by a spacer. The mold is inserted in a press and the temperature is reduced to 45° C. while increasing pressure to about 800 psi. This temperature and pressure are maintained for 4 hours. At this point analysis of residual momoner indicates the polymerization is 85% complete.

Then the temperature is increased to 90° C. for 1 hour and then 130° C. for 1½ hours to reduce residual monomer content to below 1%. The tensile, impact strength, service temperature, hardness, and clarity properties of the resultant material are indicated in Table I.

The morphology of this material is examined by means of an electron microscope, and photographed at a magnification of 10,000 X. FIG. 1 is this photomicrograph, showing a morphology which consists of a cocontinuous poly(ethylene-vinyl acetate) (EVA) and polymethyl methacrylate (pMMA) phase distribution in which the components form an interpenetrating network of extremely small, i.e., less than 0.3 microns, but distinct and and continuous domains which entwine around each other. As a result of this unique morphology, a clear material having improved tensile properties, impact strength, service temperature and hardness as compared with the corresponding material with conventional morphologies is obtained.

EXAMPLE 2 ("Cold Cast")

The procedure of Example 1 is repeated, except using 45 gms. of EVA with 245 gms. MMA. The morphology of the resulting composition appears the same as that of Example 1. The physical properties are reported in Table I.

EXAMPLE 3 - Comparative ("Hot-Cast")

Figure 2:

Example 1 is repeated except that the solution is heated to 90° C. immediately after introduction to the mold. The temperature peaks at 99° C. after 30 minutes, and then the material is heated to 130° C. for 10 minutes, and then cooled to room temperature. The resultant material is also examined with an electron microscope, and a photomicrograph at 10,000 X appears herein as FIG. 2. The morphology is a continuous ethylene-vinyl acetate phase with a dispersed, discrete pMMA phase.

EXAMPLE 4 - Comparative ("Hot-Cast")

Example 3 is repeated except using 45 gms. of EVA with 245 gms. MMA. The morphology of the resulting composition is essentially the same as that of FIG. 2. The physical properties are reported in Table I.

EXAMPLE 5 - Comparative (Schmitt et al)

Figure 3:
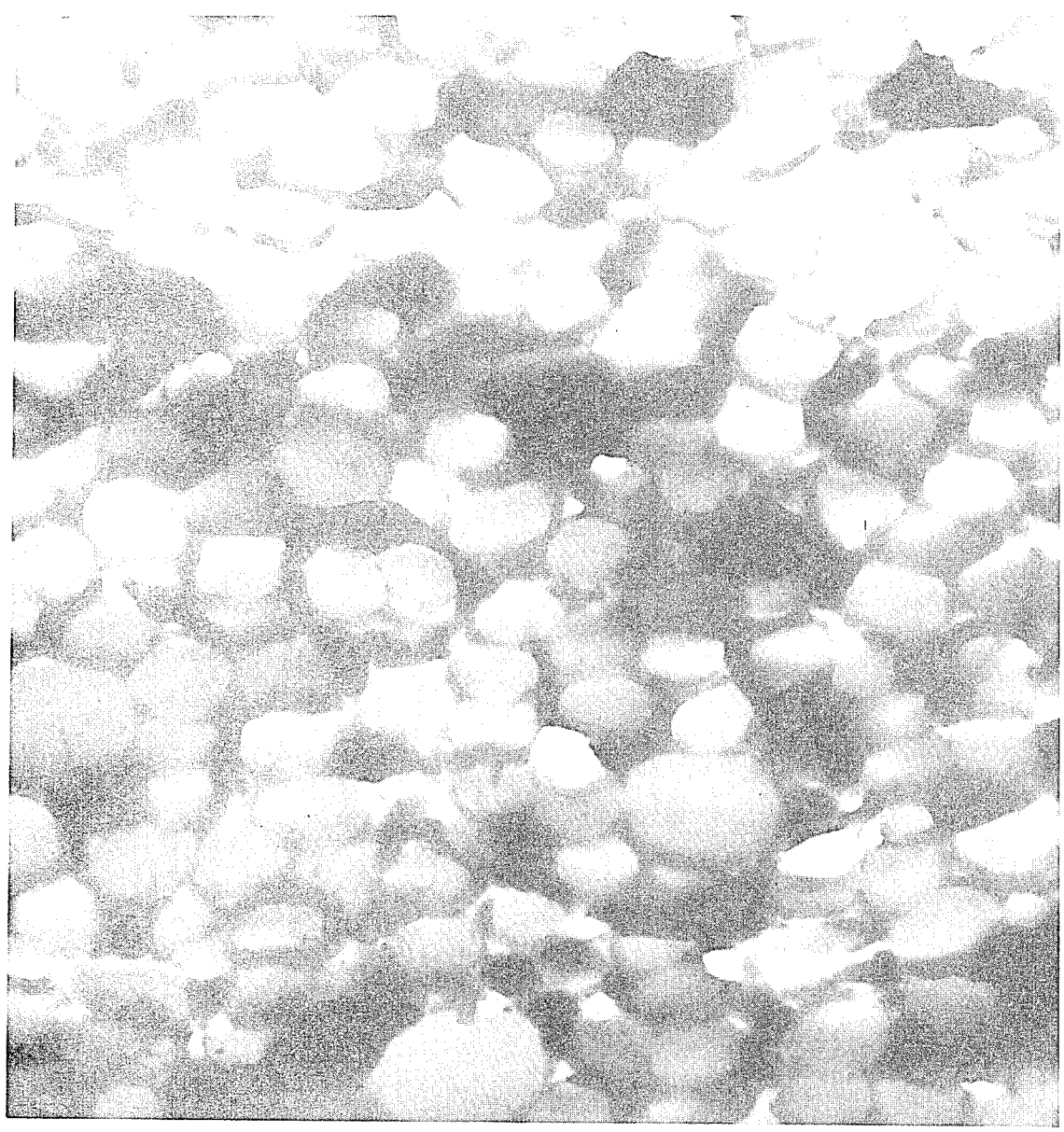

A composition produced exactly in accordance with Example 37 of Schmitt et al, U.S. Pat. No. 3,700,754, is examined with an electron microscope, and a photomicrograph at 10,000 X appears as FIG. 3. The morphology is a continuous ethylene-vinyl acetate phase with a dispersed, discrete pMMA phase. Physical properties of this material appear in Table I. The material produced is translucent. The pMMA phase appears as dark discrete particles in the photomicrograph, FIG. 3, ranging up to 0.7 microns in diameter.

EXAMPLE 6 - Comparative (Schmitt et al)

Figure 4:
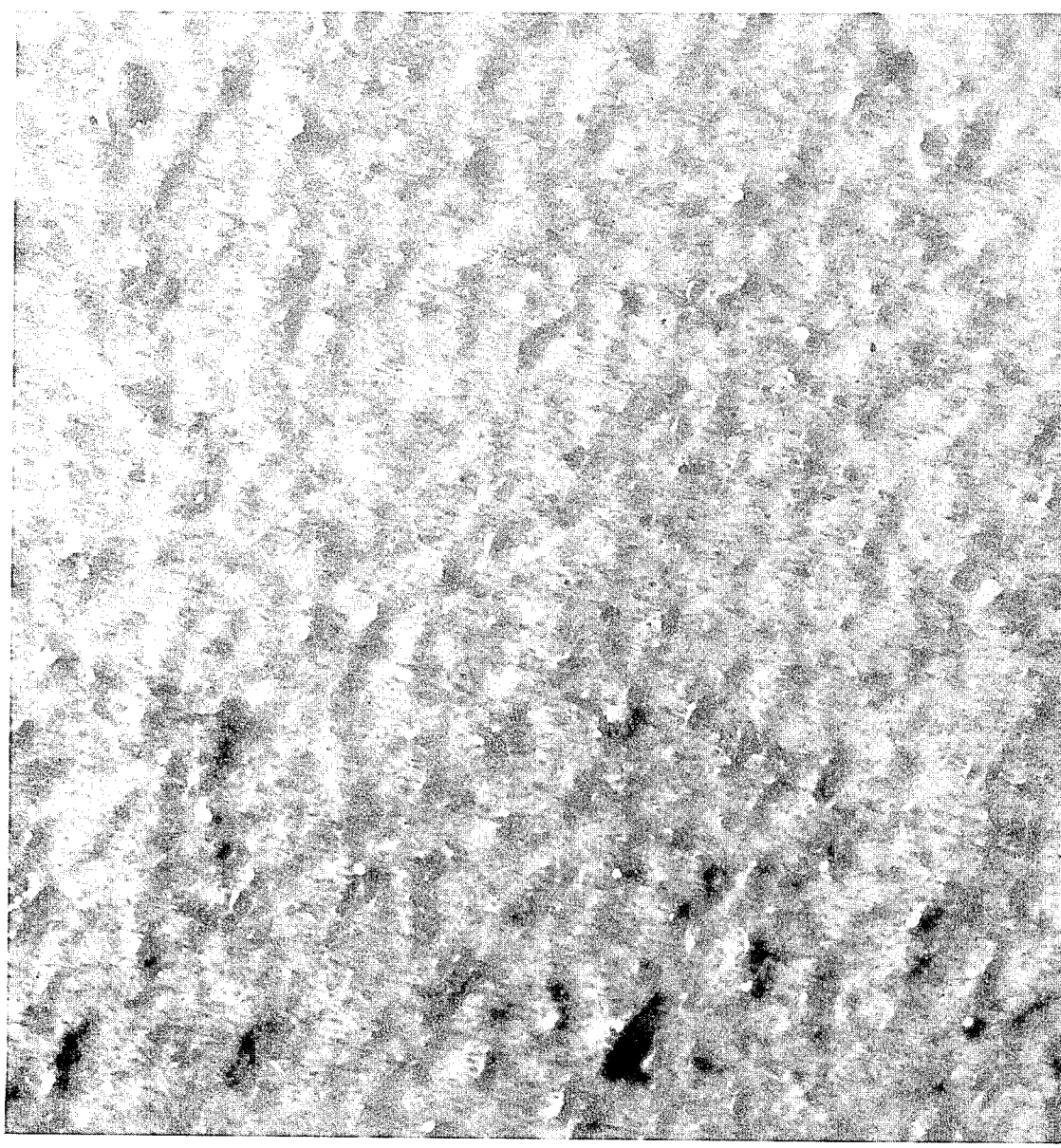
Figure 5:

A composition produced in accordance with Example 13 of Schmitt et al, U.S. Pat. No. 3,700,754 is examined with an electron microscope, and a photomicrograph at 10,000 X appears as FIG. 4. A photomicrograph at 50,000X appears as FIG. 5. The morphology is a continuous pMMA phase with a dispersed, discrete EVA phase. Although the patent example describes a "transparent, tough, hard, bubble-free sheet which does not crack, break or materially distort when subjected to violent blows from a 1 pound carpenters hammer," an opaque, flexible sheet which broke apart and crumbled when it was removed from the plattens, was obtained. Physical properties appear in Table I, and show this material to be a low modulus, low impact, and low service temperature material as compared with the composition of the invention produced in Example 1.

As shown in Table I, the physical properties of the materials produced in accordance with the invention, Examples 1 and 2, are superior to the properties of the materials produced by a conventional method, Examples 3 and 4, and by the Schmitt et al method, Examples 5 and 6.

TABLE I

| EXAMPLE | "Cold Cast" | | "Hot Cast" | | "Schmitt et al" | |
| --- | --- | --- | --- | --- | --- | --- |
|  | 1 | 2 | 3 | 4 | 5 | 6 |
| Tensile |  |  |  |  |  |  |
| Elongation at break, (%) | 71 | 50 | 15 | 7 | 3 | 10 |
| Stress (Bk) ($10^3$ psi) | 4.4 | 5.4 | 2.8 | 3.0 | 2.3 | 4.0 |
| Modulus, ($10^5$ psi) | 1.90 | 2.40 | 0.97 | 1.20 | 1.07 | 2.62 |
| Impact Strength |  |  |  |  |  |  |
| Notched Izod, (ft.-lbs./in.) | 4.1 | 3.2 | 1.6 | 1.0 | 1.4 | 1.1 |
| Gardner Variable Height, (in.-lbs.), ⅛" dart | >300 | 250 | 50 | 14 | 18 | * |
| Tensile Impact (ft.-lb./in.) | 101 | 95 | 70 | 45 | 29 | 16 |
| Service Temperature |  |  |  |  |  |  |
| DTUFL, 264 psi, (°C.) | 75 | 80 | 44 | 47 | 53 | 68 |
| Hardness |  |  |  |  |  |  |
| Rockwell Hardness, (M scale) | 25 | 56 | <1 | 5 | <1 | <1 |
| Clarity |  |  |  |  |  |  |
| Total White Light (%) | 92 | 92 | 92 | 92 | 76 | 81 |
| Haze (%) | 3 | 3 | 3 | 3 | 90 | 82 |

* Not Run

We claim:

1. A composition comprising a cocontinuous interpenetrating morphological network of (A) a polymer of at least 50 weight percent methyl methacrylate units and (B) a polymer of ethylene and vinyl acetate, wherein the ratio of (A) to (B) is about 1:0.01 to about 1:1.

2. The composition of claim 1 wherein a cross-section of said composition, when photographed at a magnification of 10,000 X using an electron microscope, exhibits a morphology substantially as in FIG. 1.

3. The composition of claim 1 wherein the ratio of (A) to (B) is about 9:1 to 7:3.

4. The composition of claim 1 wherein said polymer (A) is of at least 90% methyl methacrylate units.

5. A process comprising:
 A. dissolving a copolymer of ethylene and vinyl acetate in a monomer system comprising at least 50 weight percent methyl methacrylate wherein the ratio of said monomer system to copolymer is about 1:0.01 to about 1:1;
 B. adding to the solution produced in step A a free radical catalyst and reducing the temperature of the solution to below 55° C.;
 C. maintaining the temperature of the solution below 50° C. while polymerizing the major portion of said monomer system to form a cocontinuous interpenetrating polymer morphology.

6. The process of claim 5 wherein after Step C,
 D. the polymerization is completed by increasing the temperature to at least 90° C. to reduce the residual monomer content to less than 2 weight percent.

7. The process of claim 5 wherein the temperature of polymerization is below 45° C.

* * * * *